United States Patent
Bennis et al.

(10) Patent No.: US 8,369,904 B2
(45) Date of Patent: Feb. 5, 2013

(54) CELL PHONE BATTERY SYSTEM WITH BACK-UP RESERVE

(76) Inventors: Gary Bennis, Eau Claire, WI (US); Elizabeth Lang, Eau Claire, WI (US); Hannah Bennis, Eau Claire, WI (US)

(*) Notice: Subject to any disclaimer, the term of this patent is extended or adjusted under 35 U.S.C. 154(b) by 319 days.

(21) Appl. No.: 12/712,169

(22) Filed: Feb. 24, 2010

(65) Prior Publication Data

US 2010/0216522 A1  Aug. 26, 2010

Related U.S. Application Data (60) Provisional application No. 61/154,929, filed on Feb. 24, 2009.

(51) Int. Cl.
*H04B 1/38* (2006.01)
(52) U.S. Cl. .......... 455/572; 320/110; 320/112
(58) Field of Classification Search .......... 455/572, 455/573, 343.5; 320/103, 132, 110, 112
See application file for complete search history.

(56) References Cited

U.S. PATENT DOCUMENTS

| | | | | |
|---|---|---|---|---|
| 5,316,868 | A * | 5/1994 | Dougherty et al. | 429/9 |
| 7,687,936 | B2 * | 3/2010 | Mariasis et al. | 307/64 |
| 2007/0108946 | A1 * | 5/2007 | Yamauchi et al. | 320/132 |
| 2008/0045275 | A1 * | 2/2008 | Le | 455/572 |
| 2010/0124896 | A1 * | 5/2010 | Kumar | 455/404.1 |

* cited by examiner

*Primary Examiner* — Lester Kincaid
*Assistant Examiner* — Isaak R Jama
(74) *Attorney, Agent, or Firm* — William D. Hare; Srmana B. Rao; McNeely, Hare & War LLP (57) ABSTRACT

The invention relates to a cell phone battery pack and a method of providing backup battery power to a cell phone. The cell phone battery pack is configured to be positioned within a cell phone. The battery pack includes a first battery, a second battery and a means to allow switching between the first battery and the second battery for powering the cell phone. The first battery and the second battery may differ in one or both of size and capacity.

22 Claims, 4 Drawing Sheets

CELL PHONE BATTERY SYSTEM WITH BACK-UP RESERVE

CROSS-REFERENCE TO RELATED APPLICATIONS

This application is a non-provisional application claiming priority from U.S. Provisional Patent Application No. 61/154,929, filed on Feb. 24, 2009, the contents of which are incorporated herein in their entirety by reference.

TECHNICAL FIELD

The field of the invention generally relates to cell phone battery systems that ensure a user has reserve cell phone battery power for emergency calls.

BACKGROUND

In the last twenty years, cell phones have become ubiquitous with users purchasing cell phones for convenience as well as safety. Cell phone batteries have been developed with the objective of extending the battery life of the cell phone in both use (talk-time battery life) and when unused (standby). Cell phone talk time battery life ranges from less than two hours to more than ten hours, depending on the phone. The objective of extending the battery life responds to consumers who demand longer and longer talk time battery life and reduced need to charge the phone. At the same time, cell phone users are seeking smaller and more compact cell phones, which increase the challenge for battery manufacturers as they are being asked to increase talk time battery life in a smaller and smaller battery. By merely looking at the size of cell phones and reviewing their reported talk time batter life, it is evident that cell phone battery manufacturers have responded well to the demand for smaller batteries with longer talk time battery life.

Cell phones offer more than just convenience, of course. Many users carry a cell phone as a safety measure. For example, cell phone users rely on their cell phones to make telephone contact for assistance in the event of car problems, to seek assistance in dangerous situations, to seek aid in response to emergency medical needs, etc.

Cell phones typically have an alert system to ensure that users know when their phone's battery life is low. A common means of alerting the user to a low battery condition is by a warning beep and/or a display on the screen alerting the user to a low battery condition. The user knows at that time that very little talk time remains and the phone should be connected to a charger to recharge the battery. If the phone is not connected to a charger, the battery will eventually discharge even if left in standby mode. This is a problem when a user is not carrying the phone and it is left unattended in standby mode, e.g., the owner leaves the phone in a car in a briefcase, jacket or purse. In these situations, when the warning beep is sounded the user does not hear it and the phone battery completely discharges without the user knowing. Upon later needing the phone, such as in an emergency situation, the user likely will not have any battery power remaining to turn on the phone.

As illustrated in U.S. Pat. No. 7,388,349 it is known to add a reserve battery to a car battery to provide an emergency starting ability if the primary battery is dead or fails. The '349 Patent discloses a rechargeable battery system that includes a main battery and at least one auxiliary battery. According to the patent, the battery system is for a vehicle battery system in which the batteries are configured to fit within a housing having conventional external dimensions. The system also may include an attachment for attaching an auxiliary battery to a conventional battery and further include circuitry for switching between the main battery and the auxiliary battery. It should be noted that a car battery differs from a cell phone battery for a number of reasons. For example, a car battery is not drained during use but instead is constantly recharged during use by an alternator. As such a reserve car battery is useful when the primary car battery fails to start the car, such as a battery or alternator failure. In contrast, a cell phone battery is designed to be drained during use and later recharged.

Other dual battery systems also are known. For example, U.S. Pat. No. 5,223,351 discloses a dual battery system that includes a first battery and a second battery electrically connected in parallel to positive and negative terminals with the first battery having an open circuit voltage greater than that of the second battery so that, as current is drawn from both batteries, the amount of current drawn from each respective battery at a given voltage level varies depending on the magnitude of the current. The first battery preferably supplies most of the current at low to moderate current loads, whereas the second battery provides a greater portion of the total current at high current loads.

U.S. Pat. No. 5,487,099 discloses a portable telephone and an additional device for the portable telephone capable of improving the portability of the portable telephone. The additional device can be a battery that is attached to the existing battery of the telephone.

U.S. Pat. No. 5,973,477 discloses a multiple battery system used in a cell phone. The system includes a charging battery unit with multiple batteries that is connected to a buzzer and a high-voltage generator, both of which capable of forming a loop with the charging battery unit when the press switch is pressed. The high-voltage generator is connected to an electric guide rod controllable by a push switch to extend from or retract into the battery casing.

U.S. Pat. No. 6,037,756 discloses a power supply having a high energy capacity battery module and a high energy power battery module for providing power to a load. The high energy capacity battery module is connected to a DC to DC converter via a first switch for selectively providing power to the load. The high energy power battery module is connected to the DC to DC converter via a second switch for selectively providing power to the load.

U.S. Pat. No. 6,049,141 discloses a multi-battery system that includes a device and a method to allow multiple batteries with varying capacities and power capabilities to drive a common load. The method also adjusts the output current of one or more of the batteries driving a common load to maximize the operational time of the load. The level of the current being supplied by the battery unit is monitored and compared to a desired current level. Upon detecting a change in the level of the current, the output voltage of one or more of the battery systems is modified to return the level of the battery current to the desired current level.

U.S. Pat. No. 6,709,784 discloses an external backup battery for use with a cell phone or other device having a rechargeable battery and system that allows the battery to be recharged while still in the device. The backup battery plugs into the recharger connector on the cell phone and permits the backup battery to charge the main battery, thereby extending the life of the main battery.

U.S. Pat. No. 6,668,179 discloses a system and method for providing emergency reserve battery power. The system includes a detector that detects battery power level and causes the system to go into an emergency power reserve state that queries the user to determine if the call is an emergency call before making the call. The patent states that the battery reserve features may reserve a special portion of the battery, e.g., 5% or 10%, for only emergency situations.

U.S. Pat. No. 6,236,181 discloses a supplemental power vehicle for a radio controlled car. The supplemental power cell increases the top end speed of the vehicle and is generally a battery or batteries that are provided between the power supply for the vehicle and the motor that powers the vehicle.

SUMMARY

The objectives of the invention include one or more of the following. For example, one objective is to provide a battery pack made up of two batteries with one battery being smaller than the other in either size or capacity. The smaller battery serves primarily as a battery backup. The smaller battery also serves as a portion of the overall normal battery life of a cell phone. As another objective, the combined batteries take up the same or smaller space than the original battery when being used to replace the battery in a cell phone. As another objective, the combined batteries may take up the same amount of space or more space than the original battery of a cell phone.

As another objective, when the primary battery goes dead in a cell phone, the cell phone shuts off and the reserve battery is activated to power the cell phone by use of either a manual switch on the back of the phone, a keypad activated switch, or merely turning on the cell phone again.

As another objective, when the primary battery goes dead in a cell phone, the user has the option to cause the primary battery to automatically be replaced by the reserve battery to power the cell phone without the requirement of manually switching to the reserve battery. In this case the user is overriding the reserve feature but is notified earlier of the reduced capacity of the battery. The user also may be required to activate this feature of a cell phone where the default feature is to allow the phone to die when the primary battery dies. By allowing the primary battery to die without immediately activating the reserve battery permits the owner of the phone to be assured that there will be battery power remaining when they activate the phone. Thus, another objective is for the ability of the primary battery of the cell phone to use up its battery capacity and go dead without also causing the reserve battery to go dead. The system may be configured to determine the capacity remaining, switch to the reserve battery shortly before the primary battery would go below a minimum amount of power remaining and automatically shut down the phone. In this manner, when the user turns on the phone again the phone will be powered from the reserve battery.

As another object, the primary battery and the reserve battery may each be of a size such that a combined size of the batteries is compatible for replacing the battery in existing cell phones. The opposite ends of the battery may be configured to be the same with respect to terminal and mounting features to allow the battery to be flipped over and still fit within and function with the cell phone.

As another objective, the user may want to have the ability to use the reserve battery for day-to-day calls and save the larger capacity battery for emergency reasons. This may be arranged for certain discipline reasons such as limiting calls to a shorter duration for economic or personal reasons.

As another objective, two or more batteries are banded together, such as an adhesive tape or interlocked to hold each other together. This allows one battery or the other to be replaced without replacing the entire battery pack. The batteries can be placed adjacent to each other without being banded together and the phone configured to receive power from each battery as needed.

As another objective, a cell phone is programmed to shut off upon reaching a set capacity threshold to force the user to recognize that there is only a certain capacity remaining that may be reserved for emergency usage. Once it is used up and restarted, then the battery will discharge until fully drained.

In one general aspect, a cell phone battery pack is configured to be positioned within a cell phone to power the cell phone. The battery pack includes a first battery, a second battery and a means to allow switching between the first battery and the second battery for powering the cell phone.

Embodiments of the cell phone battery pack may include one or more of the following features. For example, the means to switch between the first battery and the second battery may be a switch on the batteries. The means to switch between the first battery and the second battery may be a switch on the cell phone. The means to switch between the first battery and the second battery may be software of the cell phone in which the first battery and the second battery are placed. The means to switch between the first battery and the second battery may be a positioning of terminals on the first battery and the second battery whereby the battery can be changed in orientation within the cell phone to switch between use of the first battery and the second battery.

The first battery may discharge during use of the cell phone without simultaneous discharge of the second battery. Upon discharge of the first battery, the second battery may not be automatically activated.

The battery pack may have terminals for the first battery and the second battery at one end of the battery. The battery pack may have terminals for the first battery and the second battery at opposite ends of the battery. Upon replacing a cell phone battery in a cell phone, the cell phone battery pack may have a size that is the same size or smaller than the cell phone battery it replaces. The first battery and the second battery may differ in one or both of size and capacity. The first battery and the second battery may be positioned together by one or more of banding, clipping, adhering and taping.

In another general aspect, a method of providing backup battery power to a cell phone includes:

providing a cell phone having a battery pack having at least a first battery of a first size and capacity and a second battery of a second size and capacity, the battery pack being configured to provide power to the cell phone;

providing means to switch from the first battery to the second battery for powering the cell phone, wherein during use the cell phone is powered by either the first battery or the second battery; and upon switching to the second battery, having the ability to use power from the second battery to make or receive a call without using power from the first battery.

Embodiments of the method may include one or more of the following features. For example, providing a cell phone with a battery pack may include providing the first battery and the second battery whereby the first battery and the second battery differ in one or both of size and capacity.

The power may be switched from the first battery to the second battery upon reaching a battery condition. The battery condition may be a threshold battery capacity. The cell phone may turn off upon reaching the battery condition. The method may further include the cell phone switching from the first battery to the second battery upon reaching the battery condition. The method may further include requiring the user to switch from the first battery to the second battery upon reaching the battery condition.

The method may include requiring the cell phone to be reactivated after the cell phone turns off in order to make a call. Power from the second battery may not be used when the cell phone is turned off. The cell phone may provide a notification upon reaching the battery condition.

In another general aspect, a cell phone battery pack is configured to be positioned within a cell phone to power the cell phone. The battery pack includes a first battery and a second battery. The first battery discharges during use of the cell phone without simultaneous discharge of the second battery. Embodiments of the cell phone battery pack may include one or more of the features described above.

The details of various embodiments of the invention are set forth in the accompanying drawings and the description below. Other features and advantages of the invention will be apparent from the description, the drawings, and the claims.

DETAILED DESCRIPTION

The inventors have developed a cell phone battery system made up of a battery pack and method of use that addresses users' safety concerns by providing cell phone users a reserve battery for emergency calls. In one general implementation of the cell phone battery system, when the cell phone's primary battery capacity is reduced as the phone is used or is otherwise discharged while idle, the user has the option to switch to the reserve battery to ensure the ability to make emergency calls.

Figure 1:
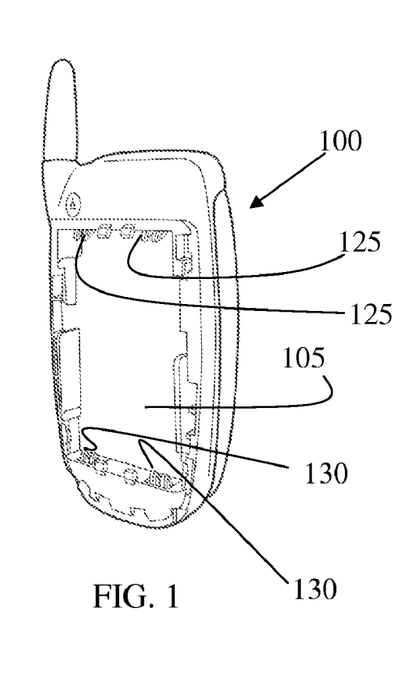
FIG. 1 is a perspective view of the back of a cell phone for use with a dual terminal cell phone battery pack showing the position for the cell phone battery pack.
Figure 2A:
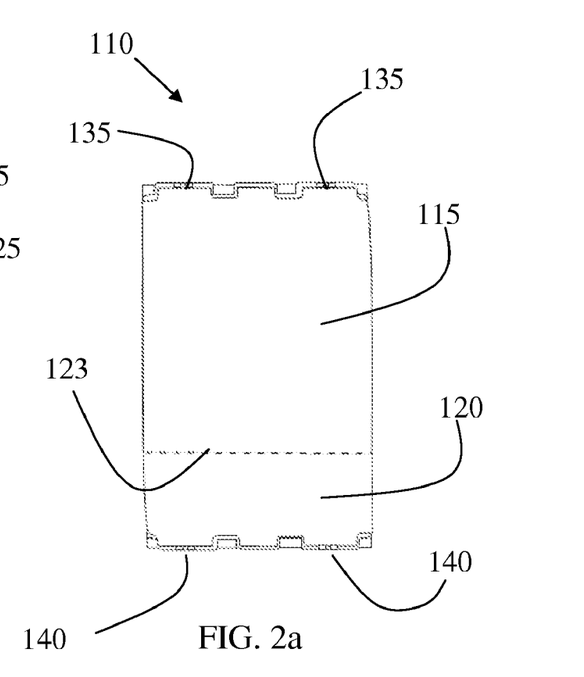
FIGS. 2a and 2b are front and end views, respectively, of a dual terminal cell phone battery pack for the cell phone of FIG. 1.
Figure 2B:
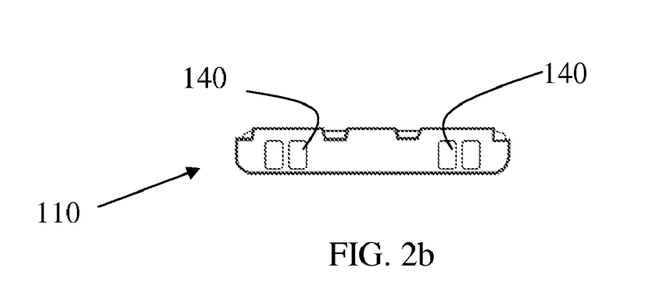

Referring to FIGS. 1, 2a and 2b, a cell phone 100 includes a battery pack space 105 that is configured to receive a cell phone battery pack 110 to provide power to the cell phone. The battery pack 110 contains a primary battery 115 and a reserve battery 120 with a divider or wall(s) 123 positioned between the two batteries. The wall 123 can be configured as a simple electrical separation between the primary battery and the reserve battery such that use of either the primary battery or the reserve battery will not simultaneously cause a discharge of the other battery. In this manner, the user can make a phone call using the primary battery 115 as the source of power. Once the primary battery capacity is emptied, the user then or later can switch to the reserve battery 120 to make a call.

The wall 123 can be configured to be a component of a tubular battery holder that includes a pair of open ends with a wall encircling a channel between the two ends. The wall 123 can be positioned within the channel such that it partially reduces the diameter of the channel. In use, each end can receive one of the batteries. Each open end may be of a dimension such that an interference fit is formed when inserting the battery into the open end. The wall 123 can be positioned between the two open ends. The wall may completely or partially block the channel formed between the two open ends. Alternatively, the channel can be completely unobstructed by a wall and the wall 123 instead formed by the outer surfaces of the ends of the batteries 115, 120.

By using the battery holder, the cell phone batteries 115, 120 may be individually removed and replaced as the need arises. For example, if the primary battery 115 loses its capacity to hold a charge, the battery pack 110 may be removed from the cell phone 100 and the primary battery removed from the holder. An off-the-shelf battery of the same dimensions can be inserted into the holder and the battery pack positioned back within the cell phone battery pack space 105.

The invention is not limited by the type or types of batteries used. For example, each battery may be of any conventional battery type, e.g., alkaline, nickel cadmium (NiCD), nickel metal hydride (NiMH), lithium ion (Li-ion) and zinc air, etc. and have a battery storage capacity that varies dependent on its size and battery technology. The primary battery and the reserve battery may be the same type or of a different type.

The battery pack 110 is insertable into the battery pack space 105 in the back of the phone. The cell phone 100 has a first pair of electrical connectors 125 within one end of the battery pack space 105 and a second pair of electrical connectors 130 at the opposite end of the battery pack space. The electrical connectors 125, 130 are configured to mate with two pairs of electrical terminals 135, 140 of the battery pack 110. The electrical terminals 135 provide power from the primary battery 115 and the electrical terminals 140 provide power from the reserve battery 120.

In the typical use of the cell phone 100, the user makes calls that are powered by the primary battery 115. After a certain amount of talk time has passed, the primary battery will lose its charge and the cell phone will either warn the user and/or the battery 115 will become completely discharged and die. The user then would switch to using the reserve battery 120. Switching between the batteries can be accomplished in a number of manners. For example, the battery pack 110 and/or cell phone can be configured such that the battery pack must be removed from the cell phone and rotated or flipped to mate different battery terminals to different connectors. Alternatively, the cell phone can have software that allows the user to switch between batteries, e.g., by use of the cell phone key pad, without the need to physically manipulate the battery.

It should be evident from FIG. 2a that the battery pack 110 is configured to be inserted into the battery pack space 105 in two orientations, in a first orientation having terminals 135 mated to connectors 125 and terminals 140 mated to connectors 130 and in a second orientation having terminals 135 mated to connectors 130 and terminals 140 mated to connectors 125. Thus, the battery pack 110 can be flipped lengthwise or rotated about its width axis to switch between the two orientations. This allows the user to customize which of battery 115 or battery 120 is used first and which is used next.

This capability of using the battery in two orientations is particularly useful when the primary battery 110 and the reserve battery 115 differ in one or both of size and capacity. A typical manner in which battery capacity is reported by battery manufacturers is based on the calculation of the product of 20 hours multiplied by the maximum constant current that a new battery can supply for 20 hours at 68 F.° (20 C.°), down to a predetermined terminal voltage per cell. Using this method, a battery rated at 100 Amp-hours will deliver 5 Amps over a 20 hour period at room temperature. It should be noted that if the battery is discharged at a higher rate, the battery will lose its charge quicker. For example, if the battery is discharged at 50 Amps, it will run out of charge before the 2 hours. In one configuration, the reserve battery 115 has between 5% and 25% of the capacity of the primary battery 110. In another configuration, the reserve battery has between 10% and 20% of the capacity of the primary battery. In another configuration, the reserve battery has approximately 15% of the capacity of the primary battery. It is expected that eventually a user will be able to pick and choose over a range of batteries to select the capacities of the primary and reserve batteries. The choice can be, for example, based on a user's individual preference for regular talk time versus emergency talk time.

If the batteries 115, 120 differ in size and/or capacity, the user may decide to use the battery with the lesser capacity for making day-to-day calls and hold back on using the battery with the higher capacity for making emergency calls. This arrangement also may be used as a feature to economize by allowing the user to end calls quicker under the pretense of the battery charge being emptied.

The battery pack 110 can be recharged in a number of manners. While the battery pack is operated such that only the primary battery or the reserve battery is discharged during a call (except potentially when switching between the batteries), the battery pack and cell phone can be configured such that the primary battery and the reserve battery are charged simultaneously upon attaching the phone to a charger.

Figure 3:
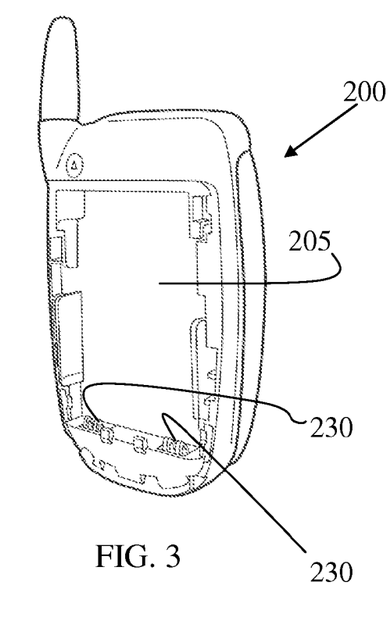
FIG. 3 is a perspective view of the back of a cell phone for use with a dual terminal cell phone battery pack showing the position for the cell phone battery pack.
Figure 4A:
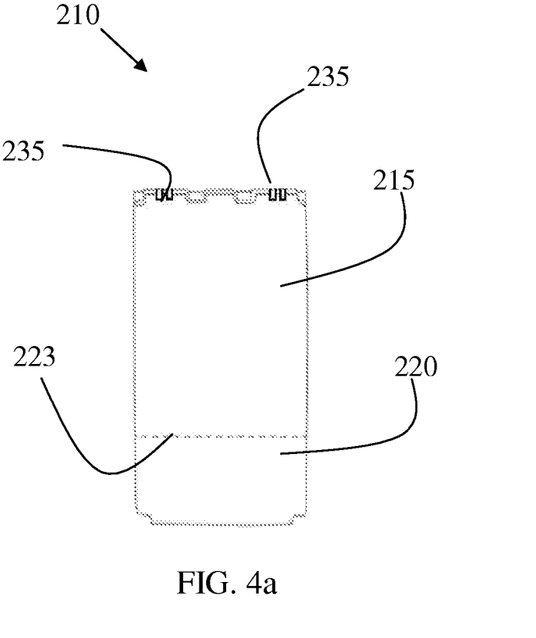
FIGS. 4a and 4b are front and end views, respectively, of a dual terminal cell phone battery pack for the cell phone of FIG. 3.
Figure 4B:
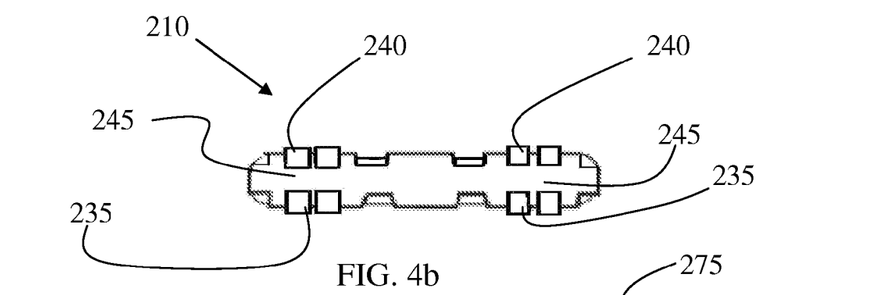

Referring to FIGS. 3, 4a and 4b, in another configuration a cell phone 200 includes a battery pack space 205 that is configured to receive a cell phone battery pack 210 to provide power to the cell phone. The battery pack 210 contains a primary battery 215 and a reserve battery 220 with a divider or wall(s) 223 positioned between the two batteries. As described above with reference to the wall 123, the wall 223 can be an electrical separation between the primary battery and the reserve battery such that use of either the primary battery or the reserve battery will not simultaneously cause a discharge of the other battery. In this manner, the user can make a phone call using the primary battery 215 as the source of power. Once the primary battery capacity is emptied, the user then or later can switch to the reserve battery 220 to make a call.

The battery pack 210 is insertable into the battery pack space 205 in the back of the phone. The cell phone 200 has a single pair of electrical connectors 230 within one end of the battery pack space 205. The electrical connectors 230 are configured to mate with either of two pairs of electrical terminals 235, 240 positioned on opposite sides of the battery pack 210. The electrical terminals 235 provide power from the primary battery 215 and the electrical terminals 240 provide power from the reserve battery 220. Circuitry, conductors or a switch may be provided with either the phone or the battery to allow power to be provided from one or the other of the batteries. For example, the batteries 215, 220 may include a switch (not shown) that controls which of the primary battery 215 and the reserve battery 220 will provide electric power to the cell phone. The switch may be a manual switch that is operable from the outside of the battery pack when the pack is mounted to the phone (e.g. a recessed two position switch on the back cover of the phone), or it may be operable only upon removing the battery pack from the phone and physically operating the switch (e.g., the switch is positioned within the battery compartment or on a surface of the batteries).

In contrast to the battery pack 110 with batteries 115, 120 of FIG. 2a which is configured to be inserted in the cell phone in two configurations based on rotating around the width axis, the battery pack 210 is configured to be inserted into the battery pack space 205 in two orientations based on rotating around the length axis. In this manner, the user can manually switch from one battery to the other by rotating the battery around its length axis such that the connectors are in contact with the terminals 235 in a first orientation or the terminals 240 in a second orientation. As illustrated in FIGS. 2a and 2b, the terminals 235 are, for example, copper strips that extend from a top surface to an end surface and the terminals 240 extend from a bottom surface to the same end surface. The terminals 235, 240, however, do not connect on the end surface because of a gap 245 positioned between the terminals to form a nonconductive region. By flipping the battery over, the connectors 230 will contact only one set of the terminals and thereby consume electrical power from only one of the batteries. As in the battery pack 110, the user can customize which of battery 215 or battery 220 is used first and which is used next.

In addition, it should be noted that a significant difference between the cell phone 100 and battery pack 110 and the cell phone 200 and battery pack 210 is the current existence of a cell phone having the connector configuration illustrated in FIG. 3 for the cell phone 200. The battery pack 210 allows a user to retrofit a current, existing cell phone with the new primary-reserve battery system to ensure that a reserve battery exists for emergency calls. However, because the inventors believe that a battery system as disclosed herein does not exist, cell phone are unlikely to be currently adapted to provide a software or keypad controlled switch between the primary battery and the reserve battery. Thus, in using the battery pack 210 to full advantage, in a simplified implementation, the user must remove the cover of the cell phone and flip over the battery to use the reserve battery. Similarly, the user must charge each battery separately by charging one battery and then flipping the battery over to charge the other battery. Nonetheless, for some users, any inconvenience caused by these manual operations will be offset by the comfort and safety gained by having a reserve battery to rely on in emergency situations.

Figure 4C:
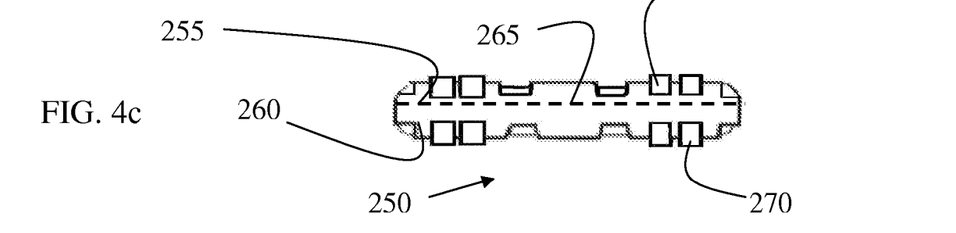
FIG. 4c is an end view of a dual terminal cell phone battery pack for the cell phone of FIG. 3.

FIG. 4c discloses a battery pack 250 that is a variation of the battery pack 210. The battery pack 250 is configured with the batteries being positioned one on top of the other in a sheet configuration rather than being positioned end-to-end. The battery pack 250 includes a primary battery 260 and a reserve battery 255 that are separated by a wall 265. Both batteries 255, 260 include battery terminals 275, 270, respectively.

The battery packs 210 and 250 are configured to be used with existing cell phone and switching between the primary battery and the reserve battery is based on reorienting the battery pack. Thus, the primary battery and the reserve battery are not discharged simultaneously during a phone call. Similarly, charging of the batteries is based on the orientation of the battery pack within the cell phone with the battery having terminals in electrical contact with the connectors 230 being the battery that will be charged. Once that battery is charged, the user must remove and reorient the battery pack within the cell phone to charge the other battery.

As an alternative feature for the battery packs 210, 250, the cell phone 200 can be configured to allow the connectors 230 to be movable within the cell phone to switch between use or charging of the primary battery or the reserve battery. The connectors 230 can be movable based on a simple mechanical or an electrically controlled switch. In this configuration, the user does not need to remove and reorient the battery but may instead operate a switch to change between the two batteries.

FIGS. 2a, 2b, 4a and 4b show the batteries positioned end-to end. However, referring to FIG. 5, in another implementation of the battery pack, a battery pack 310 is made up of a primary battery 315 and a reserve battery 320 that includes a terminal 330 with the batteries positioned side-by-side and banded together with a conventional tape, adhesive strip, adhesive or other material (not shown) to maintain the batteries together in a position adjacent to one another. The terminal 330 is configured to allow a cell phone to use one battery or the other without using both batteries simultaneously, except in some instances where both batteries are powering the phone during the transition from one battery to the other. The terminal 330 may include a switch that allows the user to switch between one battery and the other. The switch may extend only on the surface of the terminal 330 or may instead extend out through the back cover of the phone.

Figure 5:
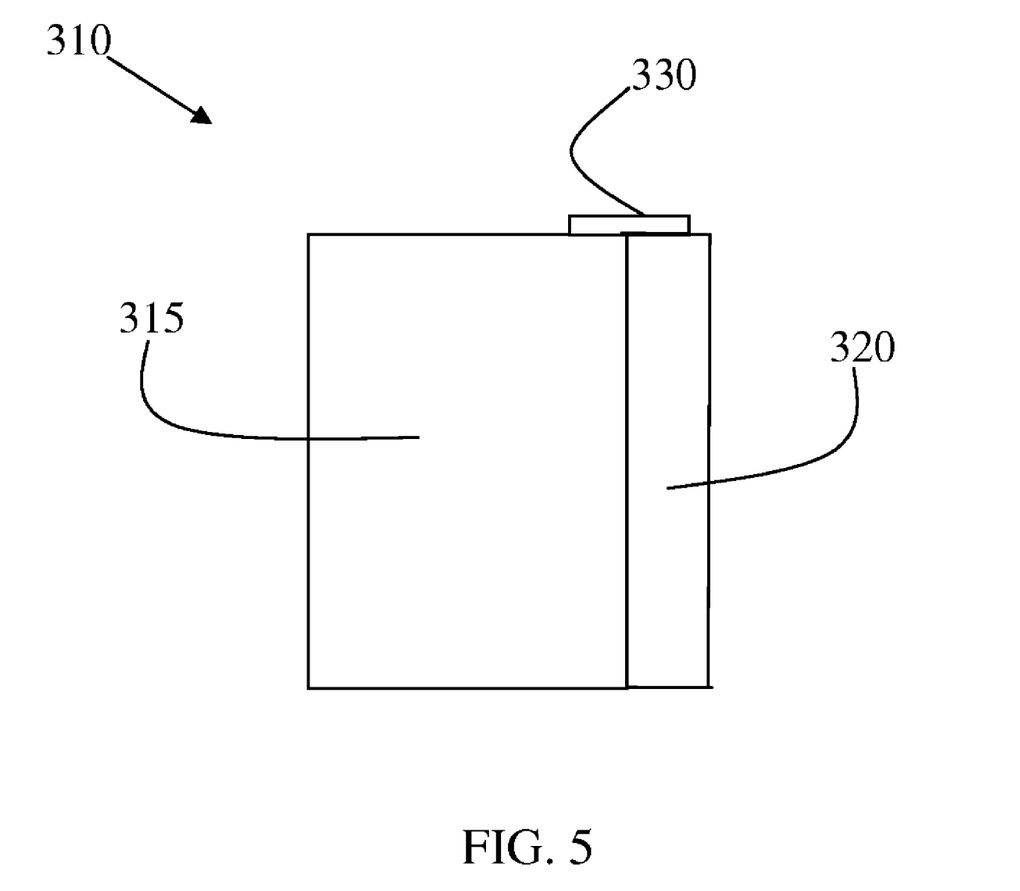
FIG. 5 is a front view of a cell phone dual battery pack having a built in switch to switch between the batteries to provide power to the cell phone

The battery packs 110, 210, 310 can be configured in a number of ways to provide a useful battery pack with a reserve battery. In one implementation, the battery pack is an aftermarket battery pack that includes two batteries whose combined size in terms of length, width and thickness is the same size or smaller than that of an original equipment manufacturer (OEM) battery pack. In this implementation, the user can purchase the battery pack and use it to replace the OEM battery pack, including using the same cell phone battery cover or a new battery cover that in some implementations may include a built in switch to switch between the primary battery and the reserve battery.

In another implementation, the battery pack can is made up of two batteries that have a combined size that is larger than the OEM part. In this configuration, the battery pack may include a substitute cover that mates with the cell phone but differs from the OEM cover by extending outward more than does the OEM cover. The objective of this implementation is to provide the reserve battery feature without losing overall battery capacity in the primary battery. By increasing the size of the primary battery to provide the same capacity as the original battery, and modifying the size to increase the thickness, the profile of the cell phone 100, 200 will be slightly increased but only to a degree that has little perceived impact to the user. In this manner, the primary battery and the reserve battery can be sized to be used with a particular cell phone cover such that the primary battery has the same capacity as the battery that it replaces so that the user has the same talk time as the battery being replaced but also includes the reserve battery with only a slight increase in thickness of the phone. In another implementation, a spare battery can be carried underneath the cell phone cover.

Figure 6:
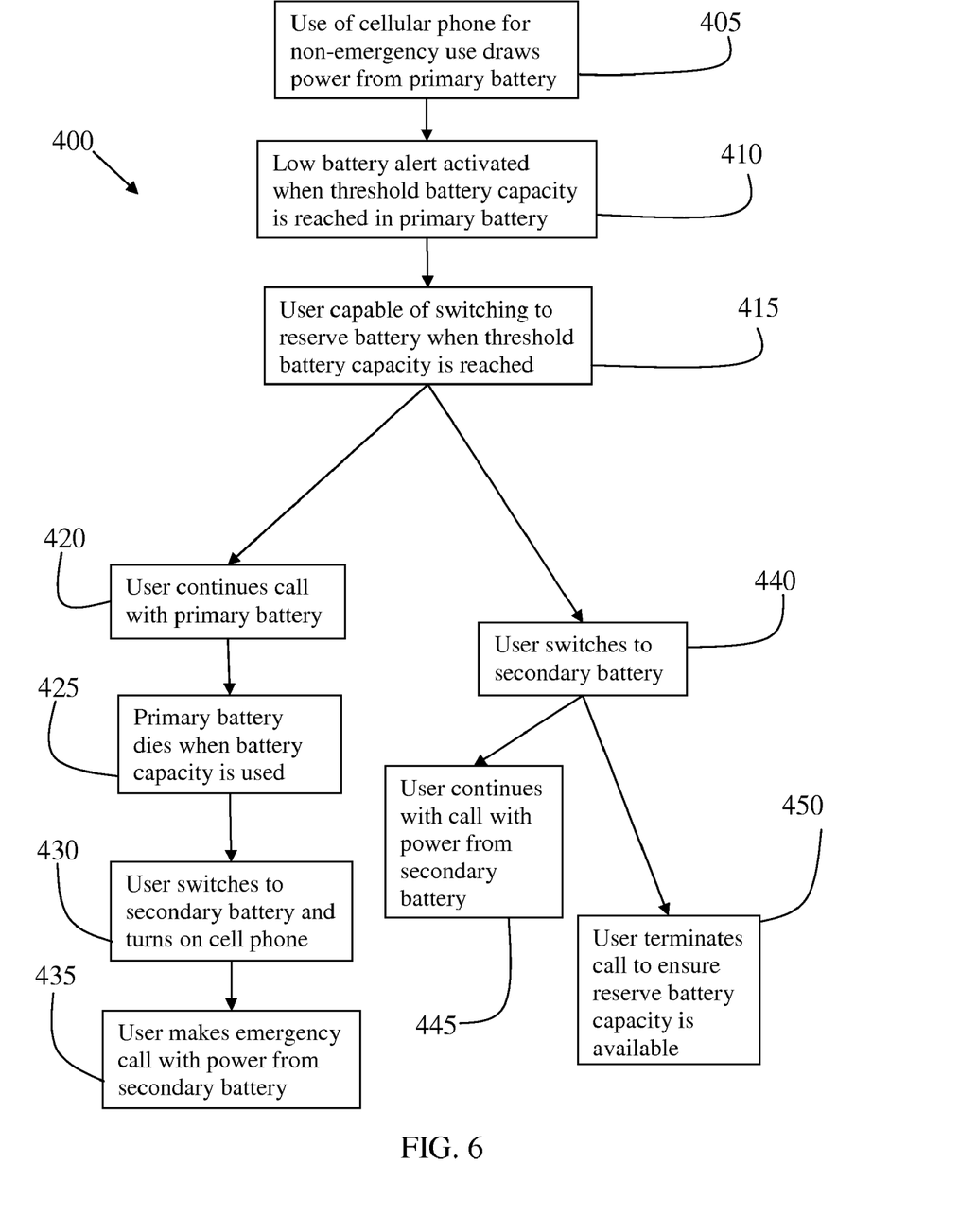
FIG. 6 is a flow chart illustrating the operation of a dual battery cell phone battery pack in a cell phone.

Referring also to FIG. 6, in another implementation, switching between the batteries in the battery pack may be a software controlled function of the cell phone. For example, in a method 400 of using the cell phone battery system with reserve battery, the user makes a call on the cell phone (step 405). During the call, the user discharges some of the capacity of the cell phone. Upon continuing to discharge a portion of the capacity of the cell phone, the phone will reach a certain discharge threshold at which point the user typically hears an audible low battery alert along with a visual message on the phone screen warning of a low battery condition (step 410). The discharge threshold can be set to occur at a level that provides the user sufficient warning that the call may suddenly end. It is well known in the art to determine the charge level in a cell phone battery and provide an alert to the user.

Upon reaching the threshold level and being alerted, the cell phone user has a number of options available. One option may be to continue with the phone call until the primary battery completely discharges (step 420). In this situation the user continues with the phone call until the call is terminated by the lack of power being supplied by the primary battery (step 425). The user then must switch from receiving power from the primary battery to the reserve battery (step 430). Alternatively, the cell phone can be configured such that upon reaching a certain remaining capacity, e.g., shortly before complete discharge, the cell phone follows a series of steps in which the battery is switched from the primary to the reserve battery and the cell phone then shuts down. Upon reactivating the cell phone, it will be powered by the reserve battery.

An advantage of the cell phone battery system, the user may determine not to switch to the reserve battery after the primary battery discharges and instead leave the phone off to prevent discharge of the reserve battery due to operation in the standby mode or upon receipt of a call. This feature prevents the phone from discharging at an accelerated rate as compared to leaving the phone off, which provides assurance to the user that they will have sufficient reserve power to make an emergency call.

Once the user switches from the primary battery to the reserve battery, the user can make or receive an emergency call (step 435). The software on the phone associated with the cell phone battery system has the option of being configured to permit the user to make outgoing emergency calls but not to receive incoming calls. In this manner, the user has addition protection against the cell phone battery pack being completely discharged and being left in the undesirable situation of being without the ability to make an emergency call. This feature may be included on the cell phone as a requirement or may be included on the cell phone as an option that the user can choose to activate.

A second option that is possible for the cell phone user upon reaching the threshold level and being alerted to the low battery condition is to switch to the reserve battery (step 440). As described above, the step of switching between batteries can be hardware driven, e.g., moving a switch on the back of the cell phone or on the back of the battery pack, software driven, e.g., pressing a button on the keypad or entering a sequence on the keypad to switch from the primary battery to the reserve battery, or require manual removal and reorienting the battery pack within the phone, such as by rotating or flipping. In either case, the user can make the switch and continue with the call using battery power from the reserve battery (step 445). Alternatively, the user can terminate the call and switch batteries to ensure that reserve battery capacity is available for emergency use (step 450).

While several particular forms of the invention have been illustrated and described, it will be apparent that various modifications and combinations of the invention detailed in the text and drawings can be made without departing from the spirit and scope of the invention. For example, the battery system described herein is suitable for multiple applications in which there is a benefit to having a guaranteed reserve battery. This can be, for example, for an emergency communications device such as a police radio, a laptop computer, a signaling device, etc. Similarly, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A cell phone battery pack configured to be positioned within a cell phone to power the cell phone, the battery pack comprising:
a first battery having at least one surface;
a second battery having at least one surface; and,
a switch configured for switching between the first battery and the second battery for powering the cell phone such that during use the cell phone is powered by either the first battery or the second battery and upon switching power from one battery to the other battery, the cell phone uses power from one battery to make or receive a call without using power from the other battery,
wherein the first battery and second battery are joined together to form the battery pack such that the one surface of the first battery is in contact with the one surface of the second battery, whereby the battery pack is configured to be housed in a single battery space within the cell phone,
wherein the switch between the first battery and the second battery comprises a positioning of terminals on the first battery and the second battery whereby the battery can be changed in orientation within the cell phone to switch between use of the first battery and the second battery to power the cell phone.

2. The cell phone battery pack of claim 1, wherein the first battery and the second battery differ in one or both of size and capacity.

3. The cell phone battery pack of claim 1, wherein the switch between the first battery and the second battery comprises a mechanical switch on the batteries.

4. The cell phone battery pack of claim 1, wherein the switch between the first battery and the second battery comprises a mechanical switch on the cell phone.

5. The cell phone battery pack of claim 1, wherein the switch between the first battery and the second battery comprises software in the cell phone in which the first battery and the second battery are placed.

6. The cell phone battery pack of claim 1, wherein the first battery can discharge during use of the cell phone without simultaneous discharge of the second battery.

7. The cell phone battery pack of claim 1, wherein upon discharge of the first battery, the second battery is not automatically activated.

8. The cell phone battery pack of claim 1, wherein the battery pack has terminals for each of the first battery and the second battery at one end of the battery pack.

9. The cell phone battery pack of claim 1, wherein the battery pack has terminals for each of the first battery and the second battery at opposite ends of the battery pack.

10. The cell phone battery pack of claim 1, wherein upon replacing a cell phone battery in a cell phone, the cell phone battery pack has a size that is the same size or smaller than the cell phone battery it replaces.

11. The cell phone battery pack of claim 1, wherein the first battery and the second battery are joined together such that the one surface of the first battery is in contact with the one surface of the second of the second battery by one or more of banding, clipping, adhering and taping.

12. A method of providing backup battery power to a cell phone, the method comprising:
providing a cell phone having a battery pack having at least a first battery of a first size and capacity and having at least one surface and a second battery of a second size and capacity and having at least one surface, the battery pack being configured to provide power to the cell phone;
providing a switch for switching the power from the first battery to the second battery, wherein during use the cell phone is powered by either the first battery or the second battery; and
upon switching to the second battery, having the ability to use power from the second battery to make or receive a call without using power from the first battery,
wherein the first battery and second battery are joined together to form the battery pack such that the one surface of the first battery is in contact with the one surface of the second battery whereby the battery pack is configured to be housed in a single battery space within the cell phone and the first battery and second battery differ in one or both of size and capacity,
wherein switching between the first battery and the second battery comprises a positioning of terminals on the first battery and the second battery whereby the battery can be changed in orientation within the cell phone to switch between use of the first battery and the second battery.

13. The method of claim 12, wherein providing a cell phone with a battery pack comprises providing the first battery and the second battery whereby the first battery and the second battery differ in one or both of size and capacity.

14. The method of claim 12, wherein the power can be switched from the first battery to the second battery upon reaching a battery condition.

15. The method of claim 14, wherein the battery condition comprises a threshold battery capacity.

16. The method of claim 14, wherein the cell phone turns off upon reaching the battery condition.

17. The method of claim 16, further comprising the cell phone switching from the first battery to the second battery upon reaching the battery condition.

18. The method of claim 16, further comprising requiring the user to switch from the first battery to the second battery upon reaching the battery condition.

19. The method of claim 16, wherein the cell phone must be reactivated after turning off to make a call.

20. The method of claim 16, wherein power from the second battery is not used when the cell phone is turned off.

21. The method of claim 14, wherein the cell phone provides a notification upon reaching the battery condition.

22. A cell phone battery pack configured to be positioned within a cell phone to power the cell phone, the battery pack comprising a first battery having at least one surface and at least one terminal and a second battery having at least one surface and at least one terminal, wherein the first battery and the second battery are joined together such that the one surface of the first battery is in contact with the one surface of the second battery, wherein the first battery discharges during use of the cell phone without simultaneous discharge of the second battery and the first battery and second battery are housed within a single battery space within the cell phone, wherein during use the cell phone is powered by either the first battery or the second battery, and the at least one terminal on the first battery and the at least one terminal on the second battery are positioned such that switching between the first battery and the second battery to power the cell phone comprises a change in orientation of the battery within the cell phone.

* * * * *